(12) United States Patent  (10) Patent No.: US 8,210,439 B2
Kangas et al.  (45) Date of Patent: Jul. 3, 2012

(54) MERCHANDISE SECURITY TAG FOR AN ARTICLE OF MERCHANDISE

(75) Inventors: P. Daniel Kangas, Raleigh, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 12/848,319

(22) Filed: Aug. 2, 2010

(65) Prior Publication Data

US 2012/0024943 A1  Feb. 2, 2012

(51) Int. Cl.
G06K 19/06 (2006.01)

(52) U.S. Cl. ........ 235/493; 235/375; 235/383; 235/385; 235/487; 235/492; 235/494

(58) Field of Classification Search .................. 235/375, 235/383, 385, 487, 492, 493, 494
See application file for complete search history.

(56) References Cited

U.S. PATENT DOCUMENTS

| 5,135,262 A | 8/1992 | Smith |
| 5,293,648 A | 3/1994 | Finley |
| 6,269,342 B1* | 7/2001 | Brick et al. ................ 705/20 |
| 6,752,837 B2 | 6/2004 | Karp |
| 6,893,489 B2 | 5/2005 | Lem |
| 7,909,248 B1* | 3/2011 | Goncalves ................ 235/383 |
| 2001/0020935 A1* | 9/2001 | Gelbman ................ 345/173 |
| 2001/0024157 A1* | 9/2001 | Hansmann et al. ........ 340/10.41 |
| 2003/0222139 A1* | 12/2003 | Stephenson et al. .......... 235/383 |
| 2005/0218218 A1* | 10/2005 | Koster ................ 235/383 |
| 2008/0235102 A1* | 9/2008 | Harris et al. ................ 705/23 |
| 2010/0012018 A1 | 1/2010 | Ribi |

FOREIGN PATENT DOCUMENTS

| JP | 05012504 | 1/1993 |
| WO | 2010018464 | 2/2010 |

* cited by examiner

Primary Examiner — Ali Sharifzada
(74) Attorney, Agent, or Firm — Olive Law Group, PLLC; Thomas E. Tyson (57) ABSTRACT

A merchandise security tag device for use in a merchandise monitoring system is provided. The merchandise security tag device may be configured to display at least one predetermined optical validation image in response to a signal received from a validation scanning process of the merchandise monitoring system. The validation scanning process may verify that the article of merchandise has been paid for by the customer. The optical validation image may be within the visible spectrum and may be verified by a store employee.

27 Claims, 7 Drawing Sheets

MERCHANDISE SECURITY TAG FOR AN ARTICLE OF MERCHANDISE

BACKGROUND

1. Field of the Invention

The present invention relates to a merchandise security tag configured to display a predetermined optical image, and more specifically, to a merchandise security tag and system for providing optical indicia of the payment status of an article of merchandise.

2. Description of Related Art

Modern stores utilize an electronic check out policy for scanning articles of merchandise and tabulating a total cost of all of the articles of merchandise. In some stores, a store employee manually checks out each of the articles of merchandise, scanning each of the items through the use of an optical scanner that is configured to read a bar code such as a Universal Product Code (UPC) that is associated with that article of merchandise and that contains information such as the price of that article. In these stores, theft of articles of merchandise is limited due to the physical presence of the store employee scanning each article of merchandise. In other stores, customers are allowed to utilize "self-checkout" procedures in which the customer manually scans their own articles of merchandise and then departs the store. In these stores, employee expenses are reduced since the customer scans their own articles of merchandise, however, these stores are also susceptible to an increased amount of merchandise theft since a store employee is not scanning each individual article. In some stores, an employee may oversee several self-checkout registers at a given time, however, the employee may miss items that were intentionally or inadvertently omitted from scanning. In other stores, one employee may be positioned at the general exits of the store to monitor the articles of merchandise taken by customers out of the store, however, this employee must verify each individual article of merchandise against the customer's receipt. Often times, the receipt may contain dozens of articles of merchandise and the store employee may not be able to review each of these articles. In addition, some persons may take an unpaid item from a store shelf and attempt to fraudulently return the item for a store credit. This type of theft may be difficult to police.

Some stores utilize tamper detection tags placed on articles of merchandise in order to track inadvertent or intentional theft. These detection tags may include magnetic and acousto-magnetic systems that produce a harmonization signal readable by an external scanner positioned at an exit of the store. In other instances, stores may use radio-frequency and microwave systems. These tags and systems suffer from various drawbacks, notably costs associated with an extra detection tag that must be activated and installed upon the article of merchandise, false alarms associated with tags that have not been deactivated when, in fact, the article of merchandise has been paid for, the fact that the tags are easily deactivated by an educated shoplifter, and an inability of store employees and customers to determine if a tag has been deactivated because the tags do not contain any visual indication of activation or deactivation.

Re-writable tags such as "E-paper" for use with electronic shelf labels have been introduced into some stores but still suffer from various drawbacks. Electronic shelf labels can provide an indication of an item's purchased state, however, electronic shelf labels require a continuous power supply in order to provide such indication. Consequently, electronic shelf labels must be positioned in proximity to a power supply or have an internal battery and have a label scanner and then be simultaneously read by a store employee while near that power supply in order to function properly.

Accordingly, there is a need for an improved security tag for articles of merchandise that addresses the problem associated with conventional security tags and E-Paper labels.

BRIEF SUMMARY

One or more embodiments of the present invention provide a device including a merchandise security tag that is configured to display at least one predetermined optical validation image thereon in response to a signal received from a validation scanning process.

One or more embodiments of the present invention provide a system including a validation scanner and a merchandise security tag that is configured to display a predetermined optical validation image thereon in response to a signal received from the validation scanner.

One or more embodiments of the present invention provide a method including scanning a merchandise security tag to determine a status thereof, the merchandise security tag configured to display at least one optical validation image corresponding to a predetermined status of the merchandise security tag and sending a signal corresponding to the predetermined status of the merchandise security tag to the merchandise security tag such that the merchandise security tag displays the optical validation image corresponding to the predetermined status.

DETAILED DESCRIPTION

Merchandise security tag devices for use in merchandise monitoring systems and associated methods are described herein. In accordance with one or more embodiments of the present invention, an exemplary merchandise security tag device may be configured to display a predetermined optical validation image in response to a signal being received from a validation scanning process of the monitoring system. The merchandise security tag device and merchandise monitoring system can provide theft deterrent and monitoring characteristics for reducing theft in retail environments.

Figure 1:
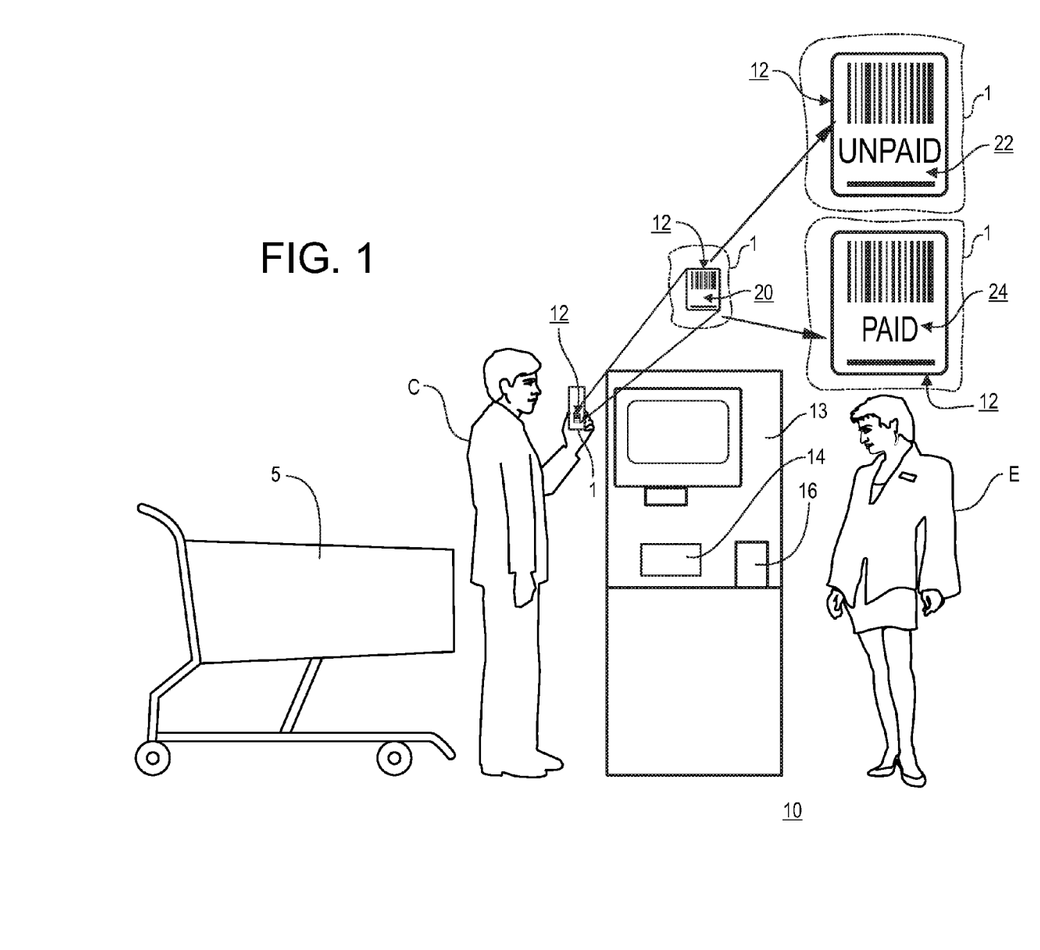
FIG. 1 sets forth an illustration of a merchandise monitoring system in accordance with embodiments of the present invention.

FIG. 1 illustrates a merchandise monitoring system 10. As illustrated in FIG. 1, the merchandise monitoring system 10 may be used to monitor articles of merchandise 1 being purchased by a customer C. The article of merchandise 1 may include a merchandise security tag 12 having a bar code printed thereon, such as a Universal Product Code (UPC), which enables a centralized processing system to scan the barcode to determine and tabulate the price of the article of merchandise 1. The article of merchandise 1 may be positioned proximal a Point-of-Sale ("POS") register 13 and the merchandise security tag 12 may be scanned across a register scanner 14 provided in communication with the register 13. The register scanner 14 may utilize optical scanning capabilities to read the bar code on the merchandise security tag 12.

The register 13 includes a validation scanner 16 that may be spaced apart from the register scanner 14 as illustrated in FIG. 1, whereas in one or more embodiments, the validation scanner 16 may be integrally formed with the register scanner 14 or may be positioned at an upstream or downstream position from the POS register 13 such as on a conveyor belt in which articles of merchandise 1 travel before or after being scanned by the register scanner 14. As illustrated in FIG. 1, the merchandise security tag 12 may define an area below the UPC code that provides optical validation images represented as 20, 22, and 24. In one or more embodiments, the system 10 is configured such that the merchandise security tag 12 displays a default optical validation image 20 when the article of merchandise 1 is on a display shelf or in a customer's C shopping cart 5. As illustrated, optical validation image 20 may be simply a portion without indicia or may take on any other suitable form. Once the customer C scans the article of merchandise 1 with the register scanner 14, the merchandise security tag 12 displays validation image "UNPAID" 22 until the article of merchandise 1 has been scanned by validation scanner 16 and the validation scanner 16 verifies that the article of merchandise 1 has been paid for and at which time the merchandise security tag 12 displays the optical validation image "PAID" 24. A store employee E may then verify the payment for the article of merchandise 1 by viewing the optical validation image "PAID" 24 on the merchandise security tag 12 of the article of merchandise 1. In one or more embodiments, the optical validation images may be any suitable image, including a color coded system that may display a predetermined color associated with a validation condition of the article of merchandise 1, or in one or more embodiments, may be a validation symbol associated with a validation condition. In one or more embodiments, the optical validation image may also include other identifying or desired characteristics, such as, but not limited to, time or date of purchase, register purchased at, and/or cashier or store employee overseeing the system at that time. Additionally, in one or more embodiments, the optical validation images may be machine readable such that an optical scanner or other suitable device may read the optical validation images to track and/or verify their status. In this manner, additional security measures may be employed where a machine may read and track the optical validation images at a store's exit or other desired location. In one or more embodiments, the optical validation images are viewable in the visible spectrum, while in one or more alternate embodiments, optical validation images are in the non-visible light spectrum such as for ultraviolet lighting. The merchandise security tag 12 is configured such that each of the optical validation images remains viewable until the merchandise security tag 12 undergoes a subsequent scanning process. In this manner, the validation state of each merchandise security tag 12 is always viewable. As illustrated in FIG. 1, the merchandise monitoring system 10 is shown as a self check-out register, but in one or more embodiments, may be any suitable register system.

In one or more embodiments, the security tag 12 may display optical validation image "UNPAID" 22 when the article of merchandise 1 is on the store shelf and/or in transit towards the POS register 13 such that the default optical image 20 displays the optical validation image "UNPAID" 22. In such an embodiment, the POS register 13. Once the customer C scans the article of merchandise 1 with the validation scanner 16, the validation scanner 16 verifies that the article of merchandise 1 has been paid for and at which time the merchandise security tag 12 displays the optical validation image "PAID" 24. In one or more embodiments, the validation scanner 16 may be formed with register scanner 14, or in one or more embodiments, may be located on a conveyor belt assembly located downstream therefrom. The validation scanner 16 may utilize a targeted magnetic field so that only the targeted article of merchandise 1 is scanned. The store employee E may then verify the payment for the article of merchandise 1 by viewing the optical validation image "PAID" 24 on the merchandise security tag 12 of the article of merchandise 1. Additionally, the store employee E may manually scan the article of merchandise 1 for the customer C.

Figure 2:
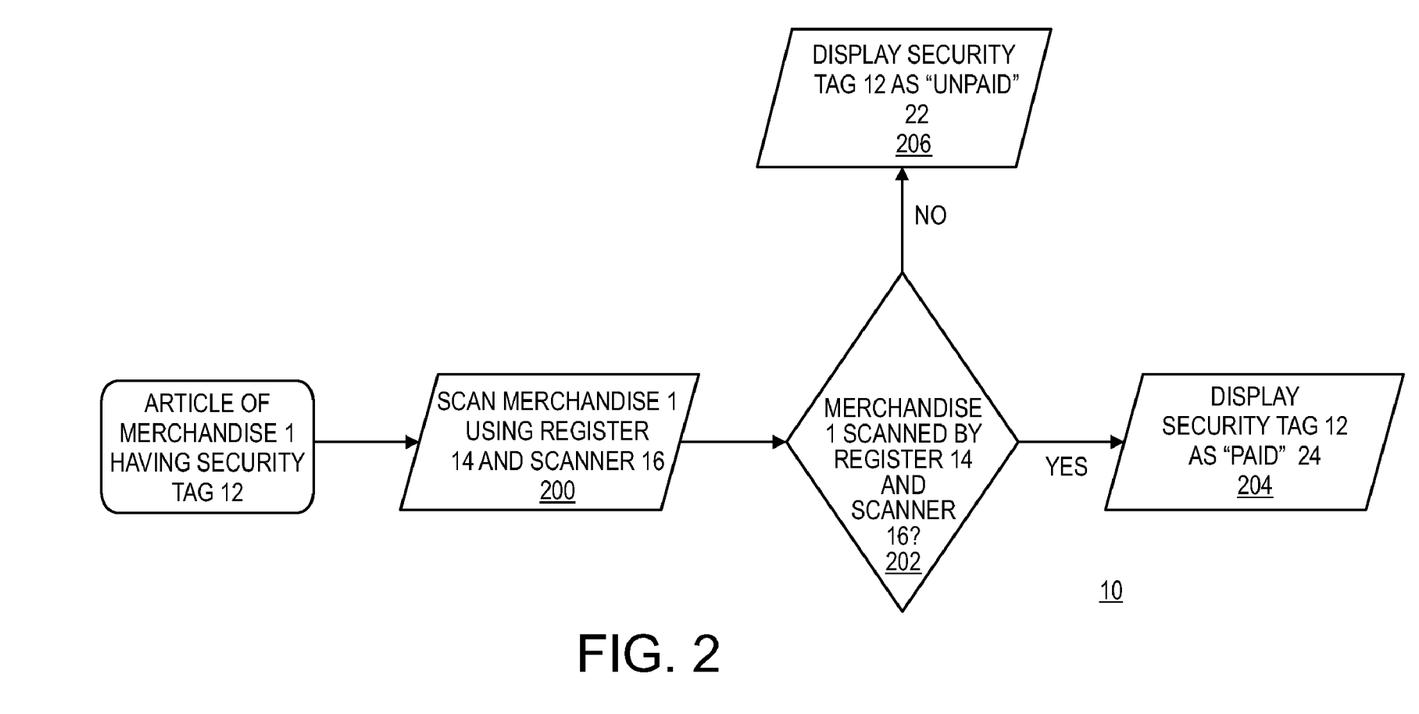
FIG. 2 sets forth a flow chart illustrating an exemplary method of operation of a merchandise monitoring system in accordance with embodiments of the present invention.

FIG. 2 illustrates a flow chart depicting an exemplary method of operation of the merchandise monitoring system 10 shown in FIG. 1. Referring to FIG. 2, the merchandise security tag 12 of the article of merchandise 1 may be scanned 200 by the register scanner 14 and the validation scanner 16. Scanning 200 by the scanners 14 and 16 may be done simultaneously or may occur in general time proximity and may be accomplished by first scanning with the register scanner 14 or first scanning with the validation scanner 16. The merchandise monitoring system 10 may then determine 202 whether the merchandise security tag 12 was scanned by both the register scanner 14 and validation scanner 16. In response to determining that the merchandise security tag 12 was scanned by the register scanner 14 and validation scanner 16, the merchandise security tag 12 may display 204 the optical validation image "PAID" 24. In response to determining that the merchandise security tag 12 was scanned by only one of the register scanner 14 or validation scanner 16, the merchandise security tag 12 may display 206 the optical validation image "UNPAID" 22. The merchandise security tag 12 displays each optical validation image in response to a signal received by each respective scanner.

Figure 3:
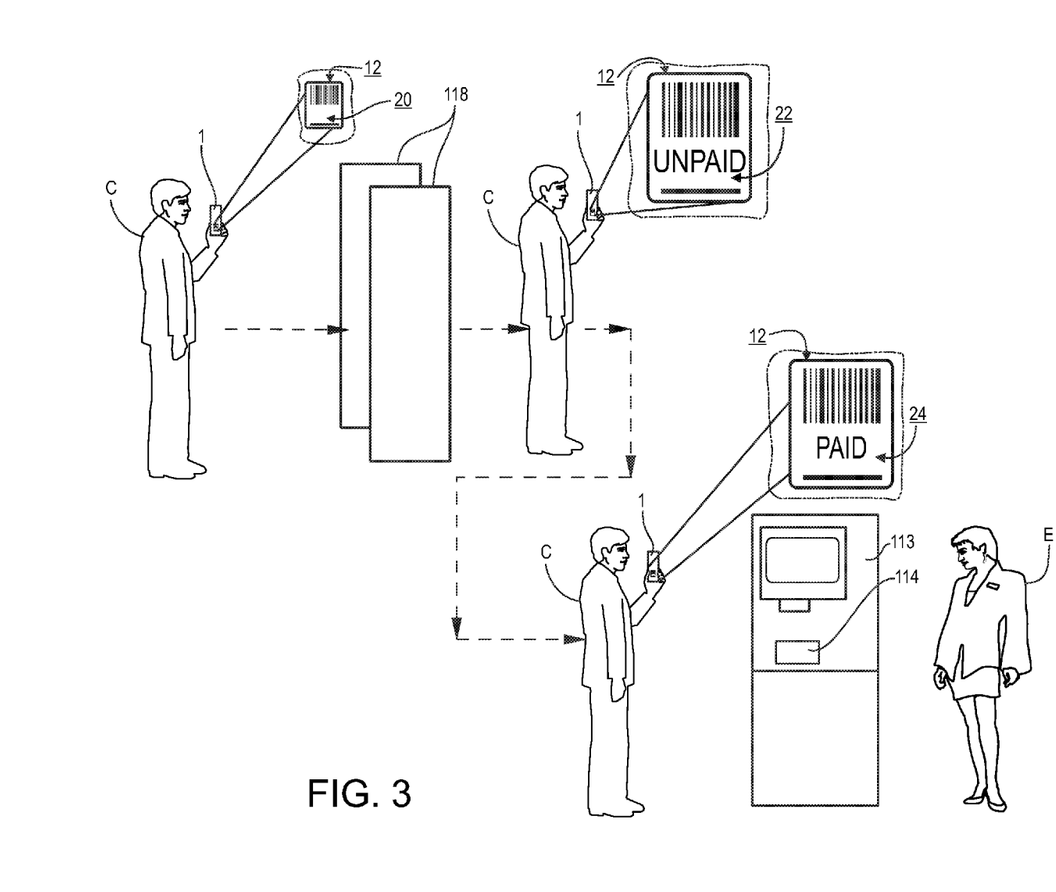
FIG. 3 sets forth an illustration of a merchandise monitoring system in accordance with embodiments of the present invention.

FIG. 3 illustrates an exemplary merchandise monitoring system 110 in accordance with one or more embodiments of the present invention. Referring to FIG. 3, the merchandise monitoring system 110 is configured to monitor the article of merchandise 1 having the merchandise security tag 12. The article of merchandise 1 is being purchased by the customer C. Like reference elements presented in accordance with the one or more embodiments presented in FIGS. 1 and 2 are represented by like referenced numerals in the one or more embodiments presented throughout the remaining drawings.

The merchandise monitoring system 110 shown in FIG. 3 may include a validation scanner 118 that is positioned upstream from a register scanner 114 of a register 113. As used herein, "upstream" refers to a time or position in the sales process occurring before the scanning process of the register scanner 114. This may include, but is not limited to, when an article of merchandise 1 is removed from the store shelves, when an article of merchandise 1 is in transit from the store shelves, when the article of merchandise 1 is positioned within a shopping cart, bag, or basket, or when the article of merchandise 1 is within a predetermined boundary of the register 113. The validation scanner 118 is illustrated in FIG. 3 as vertical upright scanners that the customer C may pass through before proceeding to the register 113, but is not so limited. In one or more embodiments of the present invention, the validation scanner 118 may be any suitable scanner and may be positioned along shopping aisles within the store, at predetermined or random locations within the store, within shopping carts, bags, or baskets, or any other suitable position.

As illustrated in FIG. 3, the customer C may pass through the validation scanner 118. Once the article of merchandise 1 is scanned by validation scanner 118, the merchandise security tag 12 displays validation image "UNPAID" 22 until the article of merchandise 1 has been scanned by register scanner 114 or, in one or more embodiments of the present invention, until payment has been received at the register 113, at which time the merchandise security tag 12 displays optical validation image "PAID" 24. At this time, a store employee E may then view the merchandise security tag 12 of the article of merchandise 1 to verify that the merchandise security tag 12 displays optical validation image "PAID" 24.

Figure 4:
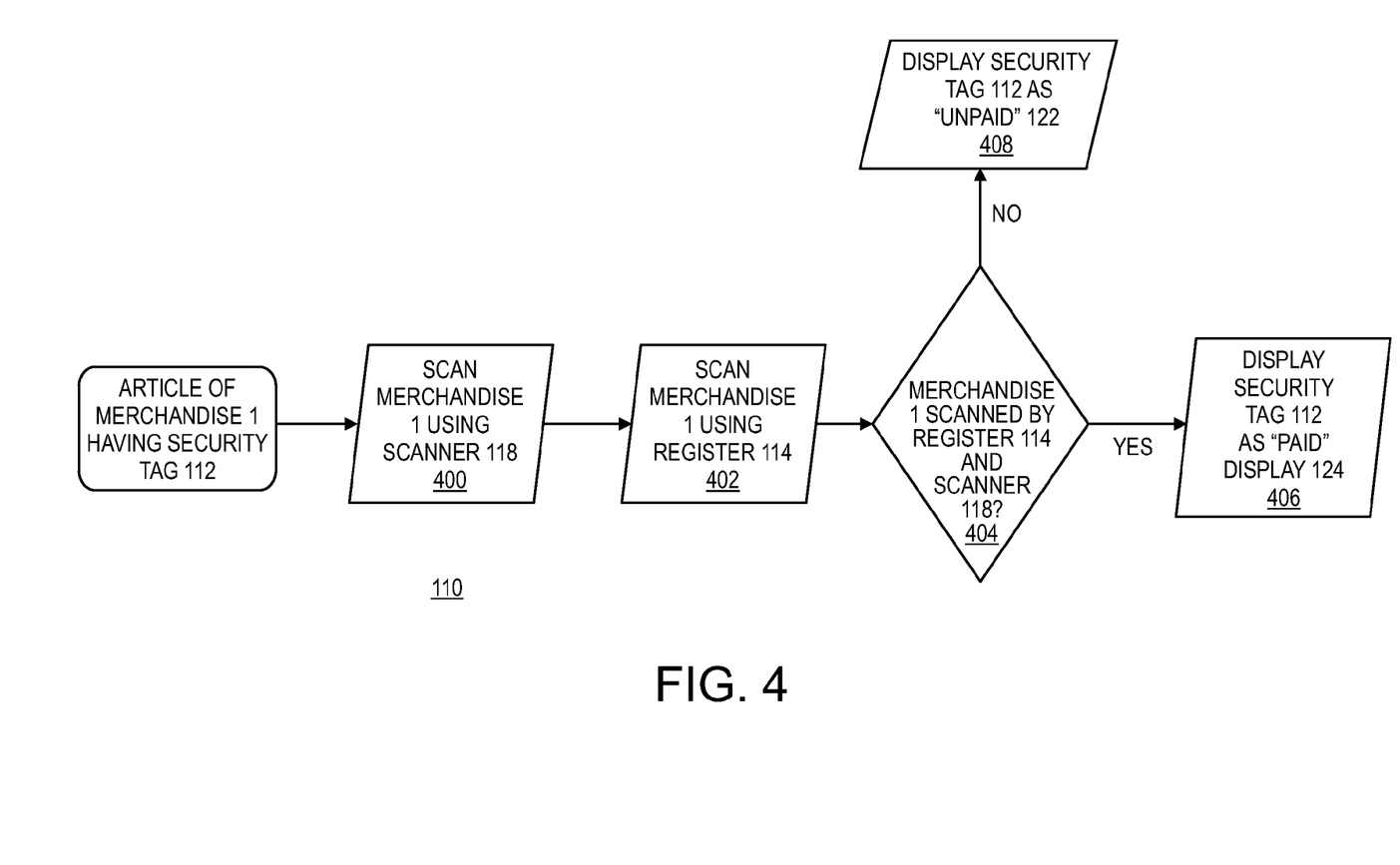
FIG. 4 sets forth a flow chart illustrating an exemplary method of operation of a merchandise monitoring system in accordance with embodiments of the present invention.

A flow chart depicting an exemplary method of operation of the merchandise monitoring system 110 is illustrated in FIG. 4. Referring to FIG. 4, the merchandise security tag 12 of the article of merchandise 1 may be scanned 400 by the validation scanner 118. In the one or more embodiments of FIG. 3 and FIG. 4, the validation scanner 118 is positioned upstream of the register 113. The merchandise security tag 12 may then be scanned 402 by the register scanner 114. The merchandise monitoring system 110 may then determine 404 whether the merchandise security tag 12 was scanned by both the register scanner 114 and validation scanner 118. In response to the merchandise monitoring system 110 determining that the merchandise security tag 12 was scanned by the register scanner 114 and validation scanner 118, the merchandise security tag 12 may display 406 the optical validation image "PAID" 24. In response to the merchandise monitoring system 110 determining that the merchandise security tag 12 was scanned by only one of the register scanner 114 or validation scanner 118, the merchandise security tag 12 continues to display the optical validation image "UNPAID" 22.

Figure 5:
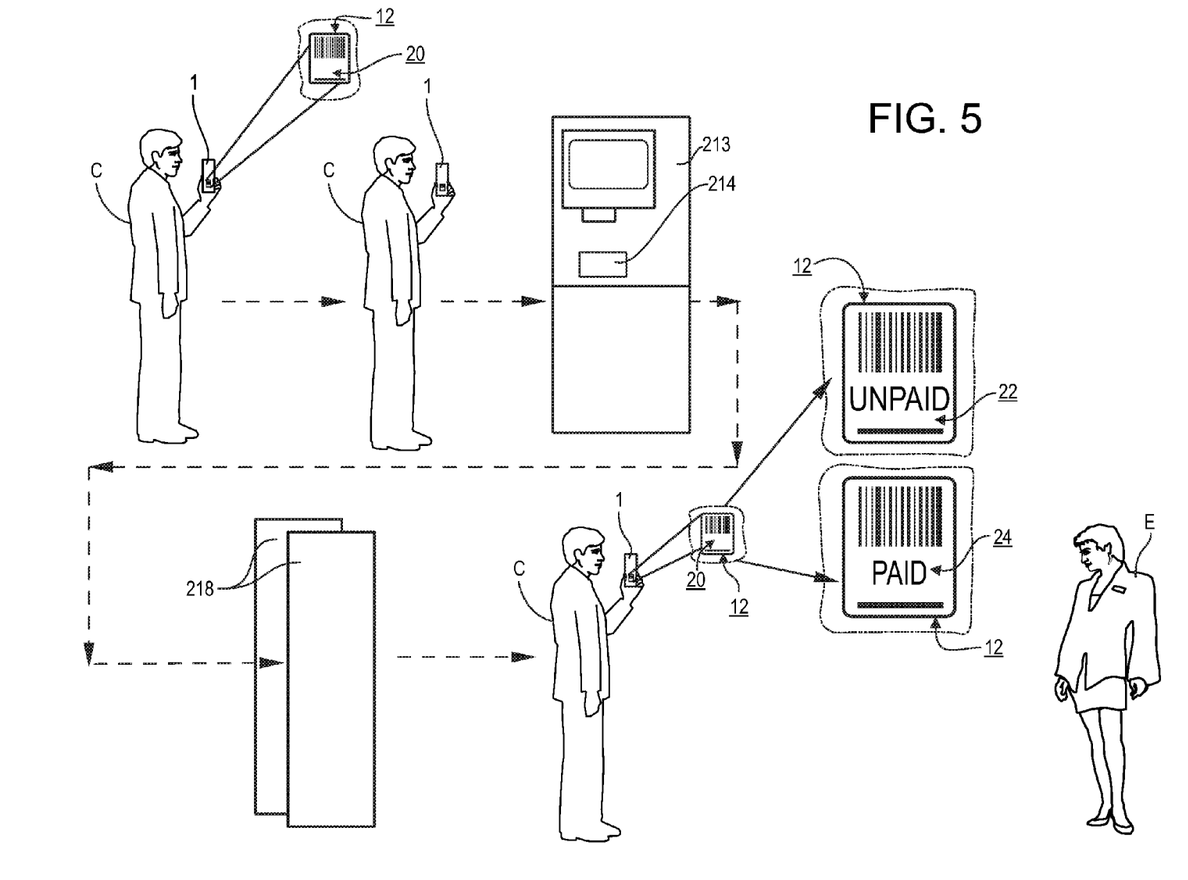
FIG. 5 sets forth an illustration of a merchandise monitoring system in accordance with embodiments of the present invention.

FIG. 5 illustrates a merchandise monitoring system 210 in accordance with one or more embodiments of the present invention. Referring to FIG. 5, the merchandise monitoring system 210 is configured to monitor the article of merchandise 1 having the merchandise security tag 12 during purchase of the article of merchandise 1 by the customer C.

The system 210 includes a validation scanner 218 positioned downstream from the register scanner 214 of a register 213. As used herein, "downstream" refers to a time or position in the sales process occurring after the scanning process of the register scanner 214. Validation scanner 218 is illustrated in FIG. 5 as vertical upright scanners that the customer C may pass through before proceeding to the register 213 but is not so limited.

As illustrated in FIG. 5, the customer C may proceed to scan the merchandise security tag 12 of the article of merchandise 1 at register 213 having register scanner 214. The system 210 is configured such that the merchandise security tag 12 displays a default optical validation image 20 until the article of merchandise 1 is scanned by register scanner 214. Once the article of merchandise 1 is scanned by register scanner 214, the customer C then proceeds through validation scanner 218, at which time the merchandise security tag 12 displays validation image "UNPAID" 22 if the article of merchandise 1 has not been scanned by register scanner 214 or validation image "PAID" 24 if the article of merchandise 1 has been scanned by register scanner 214. The store employee E may then verify the validation image of the article of merchandise 1.

Figure 6:
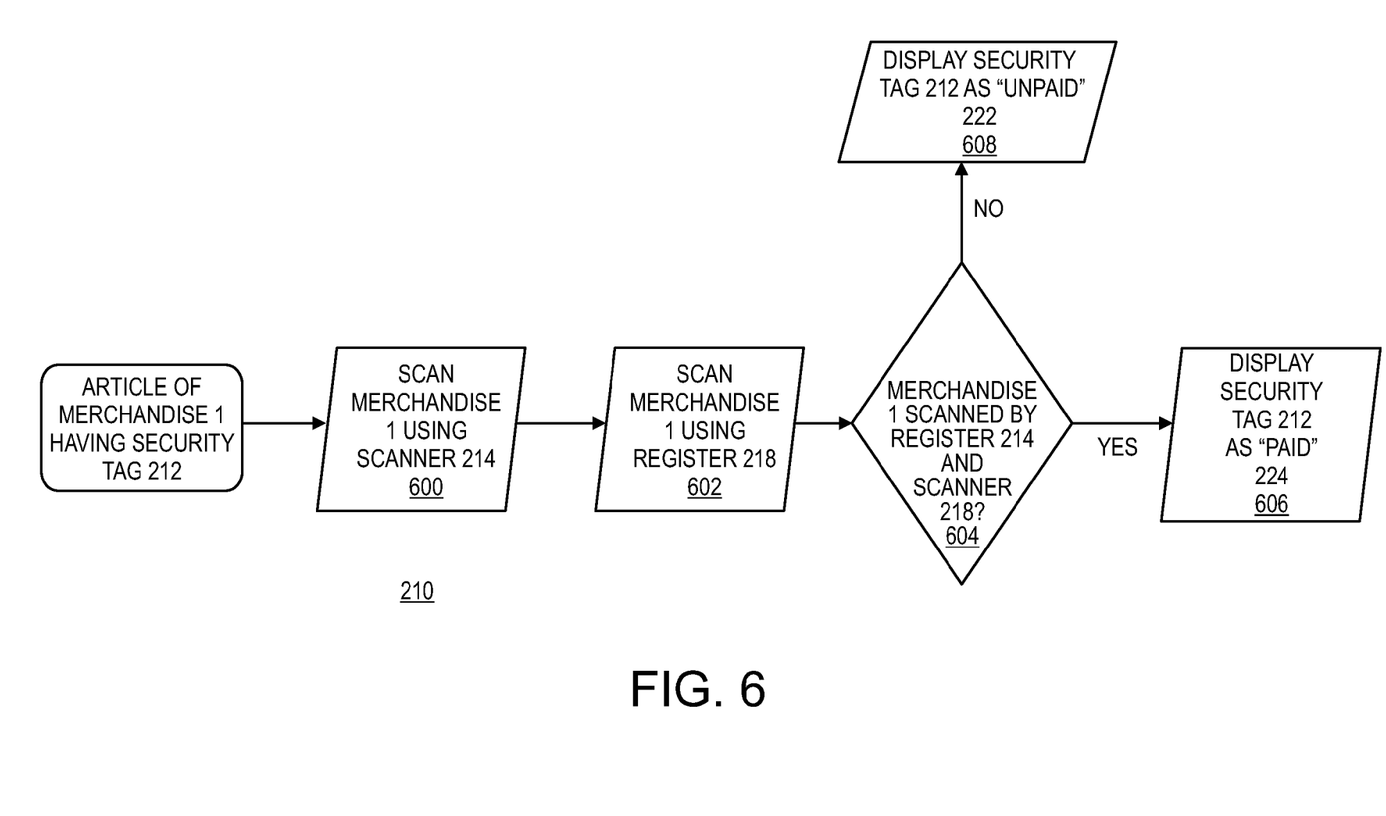
FIG. 6 sets forth a flow chart illustrating an exemplary method of a merchandise monitoring system in accordance with embodiments of the present invention.

FIG. 6 illustrates a flow chart of an exemplary method of operation of the merchandise monitoring system 210 shown in FIG. 5 in accordance with embodiments of the present invention. Referring to FIG. 6, the merchandise security tag 12 of the article of merchandise 1 is scanned 600 by register scanner 214. The merchandise security tag 12 of the article of merchandise 1 may then be scanned 602 by the validation scanner 218. In the embodiments of FIG. 5 and FIG. 6, the validation scanner 218 is downstream of the register 213. The merchandise monitoring system 210 may then determine whether the merchandise security tag 12 was scanned by both the register scanner 214 and validation scanner 218. If the merchandise monitoring system 210 determines 604 that the merchandise security tag 12 was scanned by the register scanner 214 and validation scanner 218, the merchandise security tag 12 displays 606 the optical validation image "PAID" 24. If the merchandise monitoring system 210 determinates that the merchandise security tag 12 was scanned by only one of the register scanner 214 or validation scanner 216, the merchandise security tag 12 may continue to display 608 the optical validation image "UNPAID" 22.

Merchandise security tag 12 may utilize any appropriate technology for displaying optical validation images. In one or more embodiments, merchandise security tag 12 may utilize a magnetic polymer that is aligned in a predetermined orientation in response to a signal received from one of the scanners. The magnetic polymers may be embedded amongst non-magnetic polymers within the merchandise security tag 12. This signal may be a magnetic signal such that the magnetic polymers orient in a predetermined orientation in which the polymers then reflect light to display the appropriate optical validation image. The magnetic polymers may have more than one predetermined orientation that then displays more than one optical validation image depending on the polymers' orientation. For example, the validation scanner may output a validation signal of a first predetermined magnitude if the status of the article of merchandise is determined to be "PAID" by the respective merchandise monitoring system. In that instance, the magnetic polymers would be configured to orient such that the optical validation image "PAID" 24 displays. Similarly, the validation scanner may output a validation signal of a second predetermined magnitude if the status of the article of merchandise is determined to be "UNPAID" by the respective merchandise monitoring system. In that instance, the magnetic polymers would be configured to orient such that the optical validation image "UNPAID" 22 displays. These validation signals may be magnetic signals having predetermined intensities or other desired characteristics. In one or more embodiments, the optical validation images may be provided on the merchandise security tag 12 having a UPC code as shown throughout the drawings, or may be provided on a separate label. Additionally, in one or more embodiments, the magnetic polymers may have orientations that reflect a predetermined wavelength of light such that different colors can be deflected by the polymers depending on the polymers' orientation.

One of the advantages of the magnetic polymer technology is that the magnetic polymers orient themselves in response to a signal and then remain in that orientation unless acted upon by a subsequent signal. Accordingly, the system disclosed herein may use "passive" scanning technologies in the sense that the optical validation image remains visible on the merchandise security tag 12. This provides the advantage of being able to view an optical validation image of the merchandise security tag 12 in any position within a store instead of only at a predetermined checkout. For example, once the merchandise security tag 12 of the article of merchandise 1 displays the optical validation image "UNPAID" 22, that image remains visible until a subsequent scanning process.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 7:
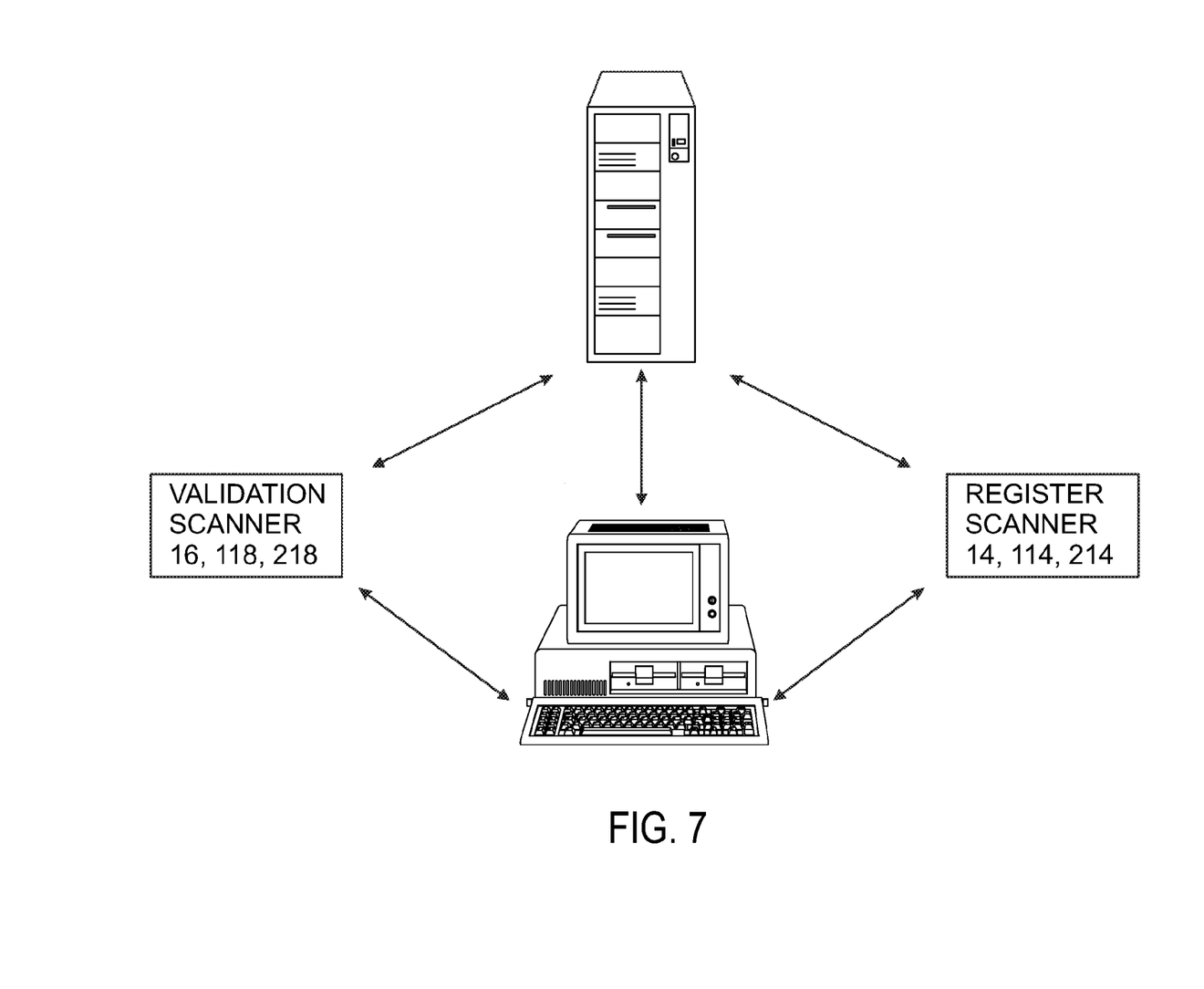
FIG. 7 sets forth a flow chart illustrating a computer system and network in communication with one or more exemplary systems and methods of merchandise monitoring in accordance with embodiments of the present invention.

As illustrated in FIG. 7, a computer 300 communicates with Register Scanner, represented as 14, 114, and 214 in FIGS. 1, 3, and 5, respectively, and communicates with validation scanner 16, 118, and 218 in FIGS. 1, 3, and 5, respectively. Computer 300 may additionally be in communication with a network server 310. The computer 300 may utilize a computer program product embodied in one or more computer readable medium(s) having computer readable program code embodied thereon. Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow chart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device comprising:
a merchandise security tag configured to display a first predetermined optical validation image thereon corresponding to a first payment status of an article in response to a first signal received from a validation scanning process, and
wherein the merchandise security tag is configured to display a second predetermined optical validation image thereon corresponding to a second payment status of the article in response to a second signal received from the validation scanning process,
wherein the merchandise security tag comprises a magnetic polymer embedded therein, wherein a first portion of the magnetic polymer defines the first predetermined optical validation image, and wherein a second portion of the magnetic polymer defines the second predetermined optical validation image.

2. The device according to claim 1, wherein the first portion of the magnetic polymer is aligned in a first predetermined orientation in response to the first signal received from the validation scanning process, and further wherein, the first predetermined orientation defines the first predetermined optical validation image, and
wherein a second portion of the magnetic polymer is aligned in a second predetermined orientation in response to the second signal received from the validation scanning process, and further wherein the second predetermined orientation defines the second predetermined validation image.

3. The device according to claim 1, wherein the first signal received from the validation scanning process comprises a first magnetic field, and
wherein the second signal received from the validation scanning process comprises a second magnetic field.

4. The device according to claim 1, wherein the merchandise security tag displays a default optical image.

5. The device according to claim 4, wherein the first payment status and the second payment status are each determined by the validation scanning process.

6. The device according to claim 5, wherein the merchandise security tag displays the first predetermined optical validation image until receiving a subsequent signal from the validation scanning process.

7. The device according to claim 1, wherein the merchandise security tag includes a Universal Product Code (UPC).

8. The device according to claim 1, wherein each of the first and second predetermined optical validation images are in the visible light spectrum.

9. The device according to claim 1, wherein each of the first and second predetermined optical validation images are machine readable.

10. A system comprising:
a validation scanner; and
a merchandise security tag configured to display a first predetermined optical validation image thereon corresponding to a first payment status of an article in response to a first signal received from the validation scanner, and
wherein the merchandise security tag is configured to display a second predetermined optical validation image thereon corresponding to a second payment status of the article in response to a second signal received from a validation scanning process,
wherein the merchandise security tag comprises a magnetic polymer embedded therein, wherein a first portion of the magnetic polymer optical validation image, and wherein a second portion of the magnetic polymer defines the second predetermined optical validation image.

11. The system according to claim 10, wherein the first portion of the magnetic polymer is aligned in a first predetermined orientation in response to the first signal received from the validation scanner, and further wherein, the predetermined orientation defines the first predetermined optical validation image, and
wherein a second portion of the magnetic polymer is aligned in a second predetermined orientation in response to the second signal received from the validation scanning process, and further wherein the second predetermined orientation defines the second predetermined validation image.

12. The system according to claim 10, wherein the first signal received from the validation scanner comprises a first magnetic field, and
wherein the second signal received from the validation scanning process comprises a second magnetic field.

13. The system according to claim 10, wherein the merchandise security tag displays a default optical image.

14. The system according to claim 13, wherein the first payment status and the second payment status are each determined by the validation scanning process.

15. The system according to claim 14, wherein the merchandise security tag displays the first predetermined optical validation image until receiving a subsequent signal from the validation scanning process.

16. The system according to claim 10, wherein the merchandise security tag includes a Universal Product Code (UPC).

17. The system according to claim 10, wherein each of the first and second predetermined optical validation images are in the visible light spectrum.

18. The system according to claim 10, wherein each of the first and second predetermined optical validation images are machine readable.

19. The system according to claim 10, further including a register scanner in communication with the validation scanner, wherein each of the register scanner and the validation scanner communicate with one another to determine whether the merchandise security tag is associated with the first payment status or the second payment status.

20. A method comprising:
scanning a merchandise security tag to determine whether the merchandise security tag is associated with a first payment status or a second payment status, the merchandise security tag configured to display a first optical validation image corresponding to the first payment status, and the merchandise security tag configured to display a second optical validation image corresponding to the second payment status, wherein the merchandise security tag comprises a magnetic polymer embedded therein, wherein a first portion of the magnetic polymer defines the first optical validation image, and wherein a second portion of the magnetic polymer defines the second optical validation image; and
sending a signal corresponding to one of the first payment status and the second payment status of the merchandise security tag to the merchandise security tag such that the merchandise security tag displays one of the first optical validation image and the second optical validation image corresponding to the signal.

21. The method according to claim 20, wherein scanning a merchandise security tag comprises determining if the merchandise security tag has been scanned by a point of sale scanner.

22. The method according to claim 20, wherein scanning a merchandise security tag comprises determining if the merchandise security tag has been scanned by a scanner downstream of a point of sale scanner.

23. The method according to claim 20, wherein scanning a merchandise security tag comprises determining if the merchandise security tag has been scanned by a point of sale scanner and a scanner downstream of a point of sale scanner.

24. The method according to claim 20, wherein scanning a merchandise security tag comprises determining if the merchandise security tag has been scanned by a scanner upstream of a point of sale scanner.

25. The method according to claim 20, wherein scanning a merchandise security tag comprises determining if the merchandise security tag has been scanned by a point of sale scanner and a scanner upstream of the point of sale scanner.

26. The method according to claim 20, wherein scanning a merchandise security tag comprises determining if the merchandise security tag has been scanned by a scanner upstream of a point of sale scanner and a scanner downstream of a point of scale scanner.

27. The method according to claim 20, wherein sending a signal corresponding to the one of the first payment status and the second payment status of the merchandise security tag comprises sending a magnetic signal.

\* \* \* \* \*